(12) United States Patent
Allio et al.

(10) Patent No.: US 12,221,069 B2
(45) Date of Patent: Feb. 11, 2025

(54) MODULAR STORAGE DEVICE FOR A VEHICLE CAB

(71) Applicant: Volvo Truck Corporation, Gothenburg (SE)

(72) Inventors: Stephane Allio, Chassieu (FR); Arianna Shadfar, Prades-le-lez (FR)

(73) Assignee: Volvo Truck Corporation, Gothenburg (SE)

( * ) Notice: Subject to any disclaimer, the term of this patent is extended or adjusted under 35 U.S.C. 154(b) by 258 days.

(21) Appl. No.: 17/798,991

(22) PCT Filed: Feb. 19, 2020

(86) PCT No.: PCT/EP2020/054360
§ 371 (c)(1),
(2) Date: Aug. 11, 2022

(87) PCT Pub. No.: WO2021/164862
PCT Pub. Date: Aug. 26, 2021

(65) Prior Publication Data
US 2023/0085324 A1 Mar. 16, 2023

(51) Int. Cl.
*B60R 7/06* (2006.01)
(52) U.S. Cl.
CPC ...................................... *B60R 7/06* (2013.01)
(58) Field of Classification Search
CPC ............................................................ B60R 7/06
See application file for complete search history.

(56) References Cited

U.S. PATENT DOCUMENTS 2,657,967 A * 11/1953 Gilchrist ................... B60R 7/06
312/246
5,855,310 A * 1/1999 Van Ert ................... B60R 11/06
224/543

(Continued)

FOREIGN PATENT DOCUMENTS

EP 1153796 A1 11/2001
FR 2927784 A1 8/2009

(Continued)

OTHER PUBLICATIONS

Stroage Device for Smartphone.*

(Continued)

*Primary Examiner* — Paul N Dickson
*Assistant Examiner* — Sara Laghlam
(74) *Attorney, Agent, or Firm* — Withrow & Terranova, PLLC

(57) ABSTRACT

The invention relates to a dashboard for a vehicle comprising
 a dashboard arrangement configured to receive a storage device;
 the storage device including
 a caisson having a wall surrounding an inner cavity, the caisson including at least one plate located in the inner cavity of the caisson, the plate being perpendicular to the wall of the caisson and comprising a plurality of attachment means for hooking at least one storage module on the plate, and
 sliding means to slide the caisson between a concealed position, i.e., when the caisson is embedded in the dashboard arrangement, and an extracted position, i.e., when the caisson is disengaged from the dashboard arrangement.

16 Claims, 3 Drawing Sheets

(56) References Cited

U.S. PATENT DOCUMENTS

| | | | | |
|---|---|---|---|---|
| 6,755,455 | B2* | 6/2004 | Choi | B60R 7/06 |
| | | | | 224/281 |
| 7,407,210 | B2* | 8/2008 | Arbaugh | B60R 7/04 |
| | | | | 296/37.8 |
| 7,513,553 | B2* | 4/2009 | Singh | B60N 3/08 |
| | | | | 296/37.8 |
| 8,505,794 | B2* | 8/2013 | Ardigo | B60R 7/08 |
| | | | | 224/543 |
| 2002/0135194 | A1* | 9/2002 | Schwarz | B60R 7/04 |
| | | | | 296/70 |
| 2007/0085363 | A1* | 4/2007 | Sturt | B60R 7/04 |
| | | | | 296/37.8 |
| 2019/0143903 | A1 | 5/2019 | Selvasekar et al. | |
| 2020/0056399 | A1* | 2/2020 | Mäkitalo | E05B 1/0046 |

FOREIGN PATENT DOCUMENTS

| | | | | |
|---|---|---|---|---|
| KR | 20100006177 U | 6/2010 | | |
| KR | 20190033336 A | * 3/2019 | | B60R 7/04 |

OTHER PUBLICATIONS

International Search Report and Written Opinion for International Patent Application No. PCT/EP2020/054360, mailed Oct. 14, 2020, 12 pages.

* cited by examiner

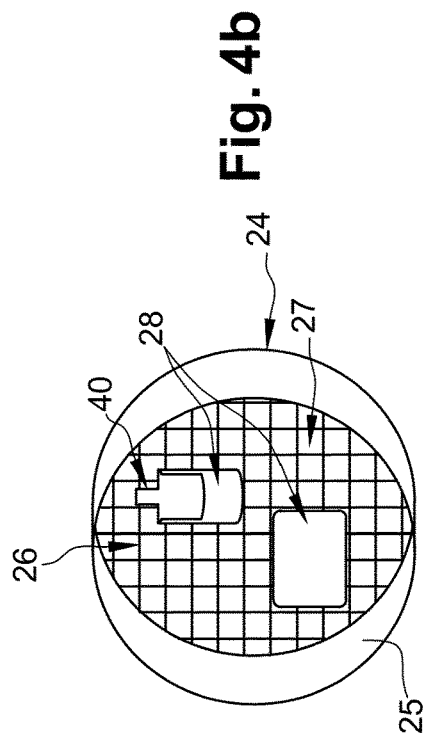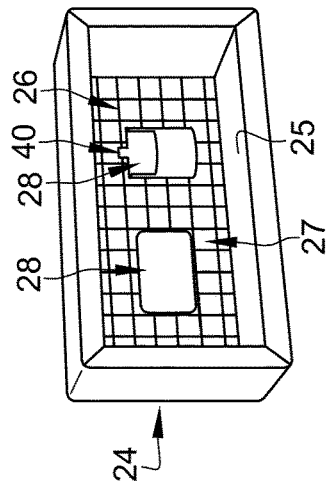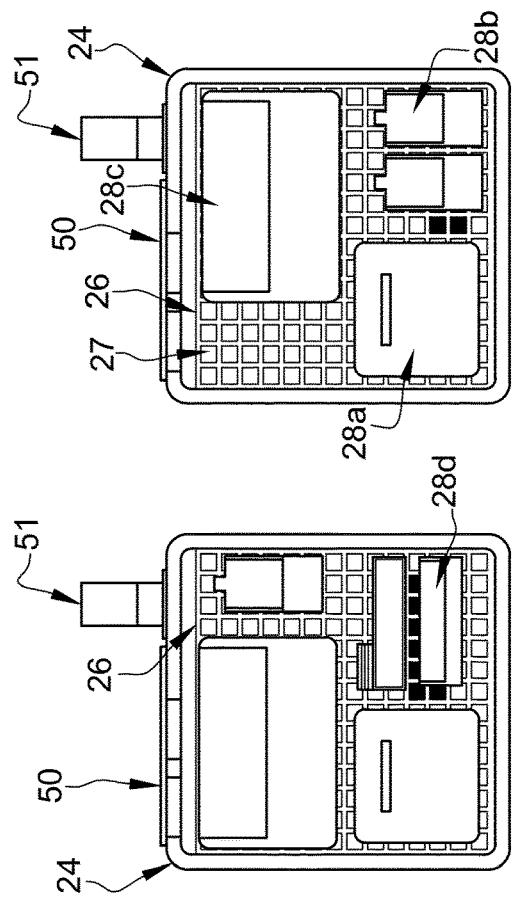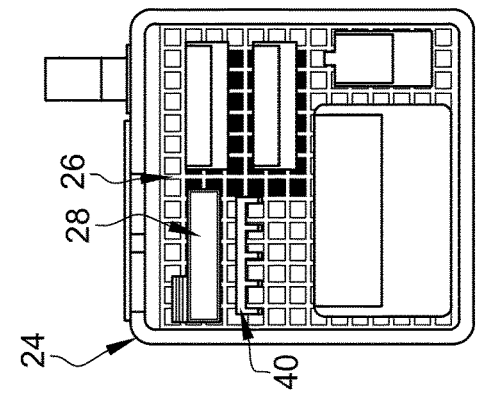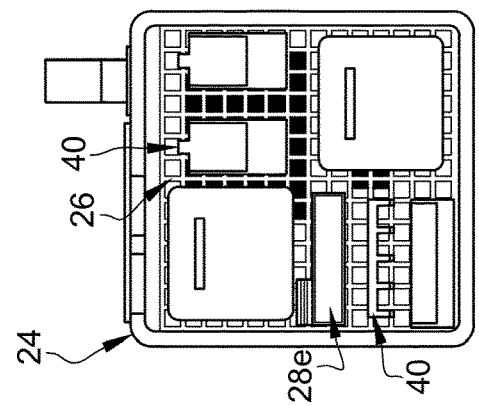

MODULAR STORAGE DEVICE FOR A VEHICLE CAB

This application is a 35 USC 371 national phase filing of International Application No. PCT/EP2020/054360, filed Feb. 19, 2020, the disclosure of which is incorporated herein by reference in its entirety.

TECHNICAL FIELD

The invention relates to a dashboard for a vehicle comprising a dashboard arrangement configured to receive a storage device and the storage device. The invention also relates to a vehicle including a cab having said dashboard arrangement.

The invention can be applied in heavy-duty vehicles, such as trucks, buses and construction equipment.

BACKGROUND

In the recent years, many arrangements have been introduced into a vehicle in order to facilitate the storage of driver and passengers objects.

Some current vehicles comprise arrangement of shelves at the back of the driver and front passenger seats. However, these arrangements are dedicated to rear passengers. Some arrangements, dedicated to the driver, exist in the dashboard. However, the storage space for accessories in the dashboard, as well as shelf-like support surfaces, are either out of the driver's reach or difficult to access. Some storages are present in the consoles of a vehicle located between the driver and front passenger seats so that the driver has access to it.

For example, the patent application US2019143903 discloses a console assembly comprises (a) a frame, including a plurality of module receivers, (b) a plurality of modules held in the plurality of module receivers and (c) a securing feature. The securing feature secures the plurality of modules in the plurality of module receivers. The securing feature includes (a) a first set of magnet elements held in a plurality of magnet element receivers enveloped by the frame and (b) a cooperating second set of magnet elements carried on the plurality of modules.

Nevertheless, only few objects can be stored into this console assembly due to its small size. Additionally, this console is not adapted to various kinds of objects, i.e. having different shapes and sizes. Finally, some objects are still not easy to reach for the driver while driving.

SUMMARY

An object of the invention is to provide a storage arrangement easily reached by the driver and/or the front passenger. Moreover, the object is to provide a storage arrangement wherein various kinds of objects having different shapes and sizes can be stored. Finally, another object is to provide a storage arrangement that easily meets the changing needs of the driver and/or the front passenger.

The object is achieved by a dashboard for a vehicle comprising:
 a dashboard arrangement configured to receive a storage device;
 said storage device including:
  a caisson having a wall surrounding an inner cavity, said caisson including at least one plate located in the inner cavity of the caisson, said plate being perpendicular to the wall of the caisson and comprising a plurality of attachment means for hooking at least one storage module on the plate, and
  sliding means to slide the caisson between a concealed position, i.e. when the caisson is embedded in the dashboard arrangement, and an extracted position, i.e. when the caisson is disengaged from the dashboard arrangement.

By the provision of the storage device in the dashboard arrangement according to the present invention, the advantage is that the driver and the front passenger have the possibility to store various kind of objects. Indeed, the storage modules can have different shapes and sizes. Moreover, there are many different ways to organize the storage modules on the plate depending on the driver's and/or front passenger's needs. Additionally, the storage device can move between a concealed position to an extracted position. Thus, the driver and the front passenger are not disturbed when they are not using it. Finally, depending on the plate location and the presence of a lateral wall being perpendicular to the wall of the caisson, the storage device can be configured to be used only by the driver, only by the front passenger or both.

In a preferred embodiment, the storage device comprises at least one storage module comprising at least one attachment mean for hooking on the plate, complementary to the attachment means present on the plate.

Preferably, at least one storage module comprises at least one attachment mean in a form of a tilting arm or a hole. When the storage module has an attachment mean in a form of a tilting arm and when the plate has attachment means in a form of a hole, the storage module can be hooked on a plate hole at its upper end and maintained by the tilting arm at its lower end. When the storage module has an attachment mean in a form of a hole and when the plate has attachment means in a form of hooks, the storage module can be hooked on the plate hook at its upper and maintained by the hook at its lower end.

Preferably, the at least one storage module further comprises at least one fixation mean to fix the storage module onto the plate. For example, the at least one fixation mean is a lever. For example, the lever is located at the centre of the storage module. In one embodiment, the lever comprises a first extremity comprising a spring and a second extremity comprising a hook. In this case, when the first extremity comprising the spring is pressed, the second extremity of the lever tilts so that the hook can be easily hooked on a hole of the plate. In this embodiment, it seems that the storage module cannot wobble, for example while driving.

Advantageously, the storage module is selected from among others: a closed box, a cup holder, a document holder, a keys holder, a phone holder, a pens holder, a cards holder, a bottle holder, a tablet holder and a toolbox.

Preferably, the wall of the caisson has a rectangular, a circular or a square shape.

In a preferred embodiment, the plate is located at one end of the caisson. In this case, only the driver or the front passenger has access to the caisson.

In another preferred embodiment, the plate is located in the middle of the caisson. In this case, the driver and the front passenger can use the storage device.

Advantageously, the caisson comprises a lateral wall being perpendicular to the wall of the caisson and being located at one end of the caisson, the plate being located close to wall. In this case, the storage device can be used by the driver or the front passenger.

Preferably, the plate is fixed onto the lateral wall of the caisson. For example, the plate is fixed using screws.

Advantageously, the plate comprises a plurality of attachment means in a form of holes or hooks.

Preferably, the sliding means comprise rails located on a lower part of the storage device and wheels located underneath the caisson. Indeed, the storage device can slide on the rails between the concealed and the extracted position.

The caisson can comprise at least one electric outlet. In this case, it is possible to plug any electrical device such as a mobile phone, a cold box or a hot box.

In a preferred embodiment, the caisson comprises a locking device to be able to move from the concealed position to the extracted position. For example, the locking device is a keyed locking device, a coded locking device or a keyless device.

The invention further relates to a vehicle comprising a cab having the dashboard according to the present invention.

Preferably, the dashboard arrangement is located on the side of the driver, between the driver and the front passenger or on the side of the front passenger.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 4a and 4b show a caisson having different shapes, FIG. 5a to 5d show embodiments of the storage modules in the storage device according to the present invention and FIG. 6 illustrates an example of a storage module having a fixation mean according to an embodiment of the invention.

DETAILED DESCRIPTION OF EXAMPLE EMBODIMENTS OF THE INVENTION

Figure 1:
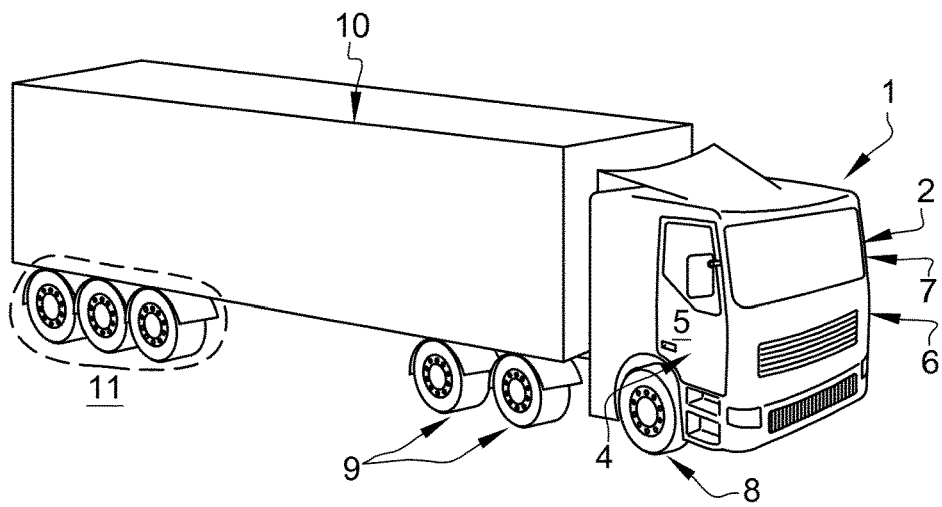
FIG. 1 is a perspective view of a vehicle according to the invention.

As illustrated in FIG. 1, the vehicle 1 can comprise a cab 2 defining a driver's compartment 3. The cab 2 has side walls 4 each comprising a door 5, a bumper 6 including a windscreen 7. The cab 2 further comprises front wheels 8, and rear wheels 9. The vehicle can also comprise a trailer 10 having one or more rear wheels 11.

Figure 2:
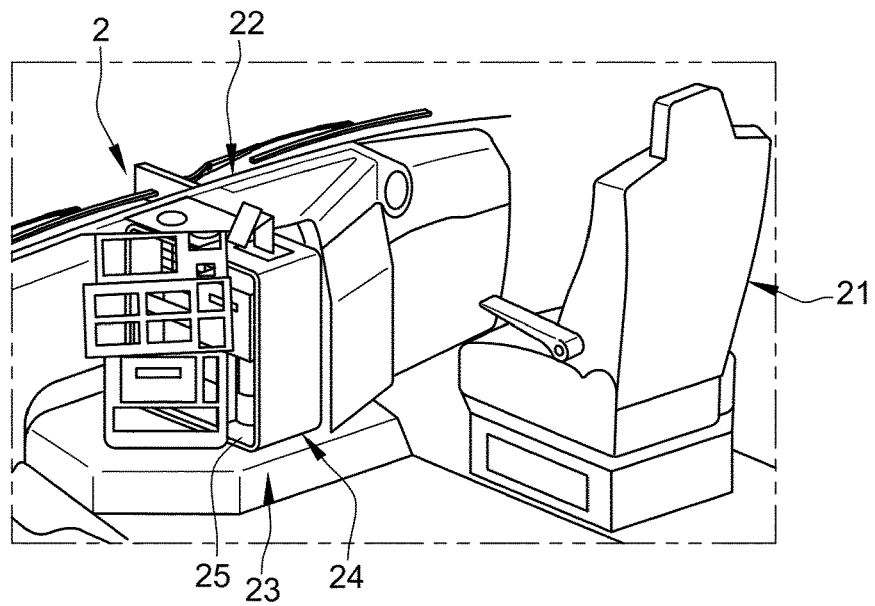
FIG. 2 is a view of the interior cab of a vehicle showing a dashboard arrangement and a storage device in the concealed position according to the present invention.
Figure 3:
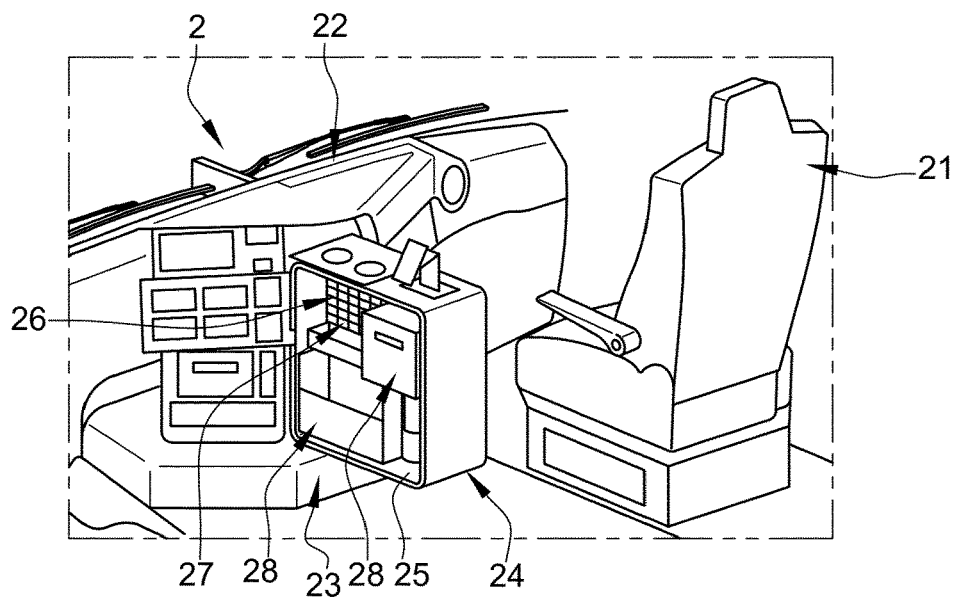
FIG. 3 is a view of the interior cab of a vehicle showing a dashboard arrangement and a storage device in the extracted according to the present invention.

As illustrated in FIGS. 2 and 3, the vehicle 1 can comprise a cab 2 having a driver seat (not shown), a passenger seat 21, a dashboard 22, said dashboard 22 having a dashboard arrangement configured to receive a storage device 23. In this example, the dashboard arrangement is located between the driver and passenger seat 21. The storage device 23 includes a caisson 24 having an wall 25 surrounding an inner cavity, said caisson 24 including at least one plate 26 located in the inner cavity of the caisson 24, said plate 26 being perpendicular to the wall 25 of the caisson 24 and comprising a plurality of attachment means 27 for hooking at least one storage module 28 on the plate 26.

The storage device 23 can further comprise sliding means (not shown) to slide the caisson 24 between a concealed position (FIG. 2) and an extracted position (FIG. 3).

In FIGS. 2 and 3, the wall 25 of the caisson 24 has a square shape. Alternatively, the wall 25 of the caisson 24 has a rectangular shape as illustrated in FIG. 4a or a circular shape as illustrated in FIG. 4b.

FIGS. 2 and 3 illustrate an embodiment wherein the plate 26 that only accessible to the driver since the plate 26 is located at the end of the caisson 24 furthest from the driver. In this example, the caisson 24 comprises a lateral wall (not shown) at the end of the caisson 24 furthest from the driver, said lateral wall being perpendicular to the wall 25 of the caisson 24 and close to the plate. The plate 26 can be fixed on the lateral wall using screws.

FIGS. 4a to 5d illustrate a plate 26 comprises a plurality of attachment means in a form of holes 27. The storage modules 28 can comprise one attachment mean in a form of a tilting arm 40. Thus, the storage module 28 can be hooked on a plate hole 27 at its upper end and maintained by the tilting arm 40 at its lower end.

The storage module can be: a closed box 28a, a cup holder 28b, a document holder 28c, a keys holder 28d, a phone holder (not shown) or a pens holder 28e.

FIGS. 5a to 5d illustrate an embodiment wherein the plate 26 is accessible to the driver and the front passenger since the plate 26 is located in the middle of the caisson 24.

The caisson 24 can comprise at least one electric outlet 50. In this case, it is possible to plug any electrical device such as a mobile phone 51.

Figure 6:
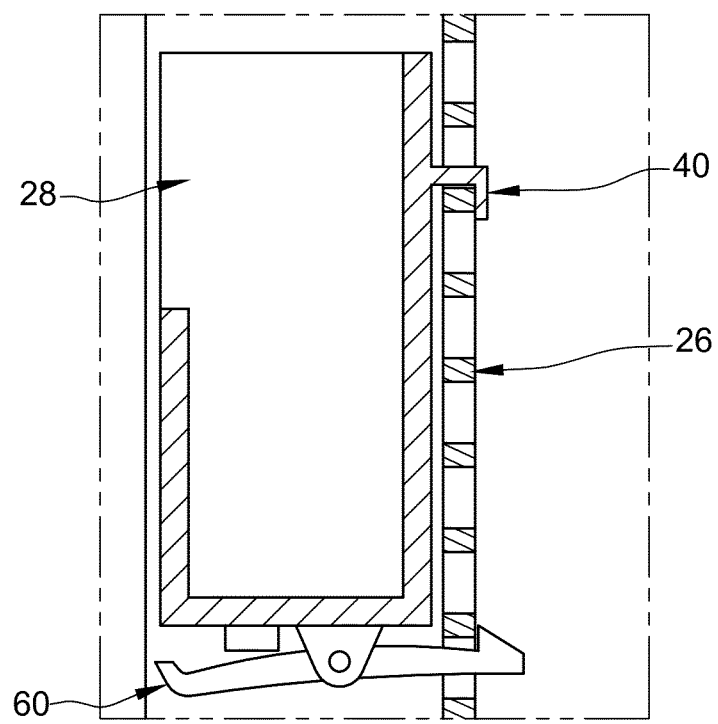

As shown in FIG. 6, the storage module 28 can further comprise at least one fixation mean 60 to fix the storage module 28 onto the plate 26. In this example, the fixation mean 60 is a lever. In one embodiment, the lever has a lock position, i.e. when the lever is hooked to the plate, and an unlock position, i.e. when the lever is not hooked to the plate. The user can press on the lever to unlock it.

The dashboard according to the present invention provides an interactive modular arrangement for the driver and/or the front passenger. Indeed, the storage device is easily organized by these users depending on their needs. Moreover, the storage device is unobtrusive since it can be hidden when it is not used. Finally, the driver can easily reach the storage device and store various kinds of objects compared to the storage device of the prior art.

It is to be understood that the present invention is not limited to the embodiments described above and illustrated in the drawings; rather, the skilled person will recognize that many changes and modifications may be made within the scope of the appended claims.

The invention claimed is:

1. A dashboard for a vehicle comprising:
   a dashboard arrangement configured to receive a storage device;
   the storage device including:
      at least one storage module;
      a caisson having a wall surrounding an inner cavity, the caisson including at least one plate located in the inner cavity of the caisson, the at least one plate being separate from and perpendicular to the wall of the caisson and comprising a plurality of attachment means for securing the at least one storage module on the at least one plate, and
      sliding means to slide the caisson between a concealed position where the inner cavity of the caisson is concealed in the dashboard arrangement, and an extracted position where the caisson is disengaged from the dashboard arrangement.

2. The dashboard of claim 1, wherein the at least one storage module further comprises at least one attachment means for hooking on the at least one plate, the at least one attachment means having a complementary shape to the plurality of attachment means on the at least one plate.

3. The dashboard of claim 1, wherein the at least one storage module comprises at least one attachment means comprising a tilting arm or a hole.

4. The dashboard of claim 1, wherein the at least one storage module further comprises at least one fixation means to fix the at least one storage module onto the at least one plate.

5. The dashboard of claim 4, wherein the at least one fixation means is a lever.

6. The dashboard of claim 1, wherein the at least one storage module comprises one or more of: a closed box, a cup holder, a document holder, a keys holder, a phone holder, a pen holder, a cards holder, a bottle holder, a tablet holder, and a toolbox.

7. The dashboard of claim 1, wherein the wall of the caisson has a rectangular, a circular, or a square shape.

8. The dashboard of claim 1, wherein the at least one plate is located at one end of the caisson.

9. The dashboard of claim 1, wherein the at least one plate is located in a middle of the caisson.

10. The dashboard of claim 9, wherein the caisson comprises a lateral wall perpendicular to the wall of the caisson, the lateral wall located at one end of the caisson, and the at least one plate located near to the lateral wall.

11. The dashboard of claim 10, wherein the at least one plate is fixed onto the lateral wall of the caisson.

12. The dashboard of claim 1, wherein the plurality of attachment means of the at least one plate comprises holes or hooks.

13. The dashboard of claim 1, wherein the sliding means comprise rails located on a lower part of the storage device and wheels located underneath the caisson.

14. The dashboard of claim 1, wherein the caisson comprises at least one electric outlet.

15. The dashboard of claim 1, wherein the caisson comprises a locking device.

16. A vehicle comprising a cab having the dashboard of claim 1.

* * * * *